United States Patent
Tseng et al.

(10) Patent No.: US 11,376,777 B1
(45) Date of Patent: Jul. 5, 2022

(54) MOLDING SYSTEM FOR PREPARING MOLDED ARTICLE WITH ORIENTATION EFFECT

(71) Applicant: CORETECH SYSTEM CO., LTD., Zhubei (TW)

(72) Inventors: Huan-Chang Tseng, Hsinchu (TW); Rong-Yeu Chang, Hsinchu (TW); Chia-Hsiang Hsu, Zhubei (TW)

(73) Assignee: CORETECH SYSTEM CO., LTD., Zhubei (TW)

( * ) Notice: Subject to any disclaimer, the term of this patent is extended or adjusted under 35 U.S.C. 154(b) by 0 days.

(21) Appl. No.: 17/480,593

(22) Filed: Sep. 21, 2021

Related U.S. Application Data (60) Provisional application No. 63/177,689, filed on Apr. 21, 2021.

(51) Int. Cl.
*B29C 45/77* (2006.01)

(52) U.S. Cl.
CPC .... *B29C 45/77* (2013.01); *B29C 2945/76605* (2013.01); *B29C 2945/76665* (2013.01); *B29C 2945/76859* (2013.01); *B29C 2945/76939* (2013.01)

(58) Field of Classification Search
CPC .......... B29C 45/77; B29C 2945/76605; B29C 2945/76665; B29C 2945/76859; B29C 2945/76939
USPC ....................................................... 425/512
See application file for complete search history.

(56) References Cited

U.S. PATENT DOCUMENTS 9,283,695 B1 * 3/2016 Tseng .................. B29C 33/3835

OTHER PUBLICATIONS

Russo, Giancarlo et al., Numerical Prediction of Extrudate Swell of Branched Polymer Melts, Rheol Acta (2010) vol. 49, p. 657-676 , Jan. 15, 2010. (Year: 2010).*

Rong-Yeu Chang and Wen-hsien Yang, "Numerical simulation of mold filling in injection molding using a three-dimensional finite volume approach," International Journal for Numerical Methods in Fluids vol. 37, Issue 2, pp. 125-148, Sep. 30, 2001.

(Continued)

*Primary Examiner* — Matthew J Daniels
*Assistant Examiner* — Gregory C. Grosso
(74) *Attorney, Agent, or Firm* — Muncy, Geissler, Olds & Lowe, P.C.

(57) ABSTRACT

A molding system includes a molding machine, a mold disposed on the molding machine, a processing module, and a controller operably communicating with the processing module. The molding machine includes a barrel, a screw moving within the barrel, a driving motor driving the screw to move a molding material. The mold has a mold cavity with a die swell structure for being filled with the molding material. The processing module simulating a filling process of the molding material based on a molding condition including a predetermined screw speed for the molding machine, wherein simulating the filling process of the molding material comprises simulating a die swell effect of the molding material in the die swell structure by taking into consideration of an effective factor, a shear viscosity, an extension viscosity, a shear rate, and a molecular orientation effect of the molding material.

13 Claims, 7 Drawing Sheets

(56) References Cited

OTHER PUBLICATIONS

Eberle, A. P. R., G. M. Vélez-García, D. G. Baird, and P. Wapperom, "Fiber Orientation Kinetics of a Concentrated Short Glass Fiber Suspension in Startup of Simple Shear Flow," J Non-Newtonian Fluid Mech 165 110-119 (2010).

Lipscomb II, G. G., M. M. Denn, D. U. Hur, and D. V. Boger, "The Flow of Fiber Suspensions in Complex Geometries," J Non-Newtonian Fluid Mech 26 297-325 (1988).

Cross, M. M., "Relation between Viscoelasticity and Shear-Thinning Behaviour in Liquids," Rheol Acta 18 609-614 (1979).

Sarkar, D. and M. Gupta, "Further Investigation of the Effect of Elongational Viscosity on Entrance Flow," J Reinf Plast Compos 20 1473-1484 (2001).

Tseng, H.-C., "A Revisitation of Generalized Newtonian Fluids," J Rheol 64 493-504 (2020).

Wang, J., J. F. O'Gara, and C. L. Tucker III, "An Objective Model for Slow Orientation Kinetics in Concentrated Fiber Suspensions: Theory and Rheological Evidence," J Rheol 52 1179-1200 (2008).

White, J. L. and A. B. Metzner, "Development of Constitutive Equations for Polymeric Melts and Solutions," J Appl Polym Sci 7 867-1889 (1963).

\* cited by examiner

MOLDING SYSTEM FOR PREPARING MOLDED ARTICLE WITH ORIENTATION EFFECT

CROSS-REFERENCE TO RELATED APPLICATION

This application claims the benefit of U.S. Provisional Patent Application No. 63/177,689 filed Apr. 21, 2021, which is incorporated herein by reference in its entirety.

TECHNICAL FIELD

The present disclosure relates to a molding system for preparing a molded article, and more particularly, to an injection-molding system for preparing a molded article using a computer-aided engineering (CAE) simulation.

DISCUSSION OF THE BACKGROUND

Applications for polymers and plastics can be found in most areas of daily life due to their versatility and economic viability in the manufacturing industry. In plastics manufacturing, the actual flow of polymer melts is transient, non-Newtonian and non-isothermal, with frozen layers building up as the complex mixture flows through the mold cavity. Characteristics of a finished product are determined by many complex factors, such as changes in the direction of flow, inclusion of ribs, and changes in thickness and holes. To control the quality of the products, a deep understanding of complicated flow fields is critical. Nowadays, computer-aided engineering (CAE) software provides realistic simulation and predictive analysis for complex flows of complex fluids.

Viscoelasticity is a primary material property of polymer melts that exhibit both viscous and elastic characteristics. The die swell effect is important to understand for viscoelastic fluids. According to results of academic research of fluid mechanics and rheology, the White-Metzner constitutive equation is a nonlinear viscoelastic model of the generalized Newtonian fluids (GNF) available in polymer processing flows.

In practice, with the White-Metzner model, it is difficult to simulate that the die swell ratio of polymer melts is increased with the average flow rate or the wall shear rate. This can be attributed to three critical problems with the White-Metzner constitutive equation. In this model, the modulus parameter cannot be determined by experimental data. The extension viscosity can become a divergent risk at high extension rates. Moreover, although the first normal stress difference can be given, the second normal stress difference is zero and not described by the model. To resolve such significant issues, the present disclosure proposes modifications to the White-Metzner constitutive equation to simulate the die swell effect. This is based on extensive research of complex viscoelastic phenomena related to the die swell of viscoelastic fluids.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

The present disclosure provides a molding system for preparing a molded article, comprising a molding machine, including a barrel, a screw mounted for moving within the barrel, a driving motor driving the screw to move a molding material; a mold disposed on the molding machine and connected to the barrel of the molding machine to receive the molding material, and having a mold cavity with a die swell structure for being filled with the molding material; a processing module simulating a filling process of the molding material from the barrel into the molding cavity based on a molding condition including a predetermined screw speed for the molding machine, wherein simulating the filling process of the molding material comprises simulating a die swell effect of the molding material in the die swell structure by taking into consideration of an effective factor, a shear viscosity, an extension viscosity, a shear rate, and a molecular orientation effect of the molding material; and a controller operably communicating with the processing module to receive the molding conditions and with the molding machine to control the driving motor of the molding machine based on the molding conditions to move the screw at the predetermined screw speed to transfer the molding material at a corresponding flow rate to perform an actual molding process for preparing the molded article.

In some embodiments, the processing module performs a model to simulate the die swell effect of the molding material, and the model is represented by an expression:

$$\frac{Wi(\dot{\gamma})}{\dot{\gamma}}\tau^{\nabla *} + \tau = 2\eta_W(\dot{\gamma})D + \tau_A = \eta_W(\dot{\gamma})D + 2\eta_W N_p D : A_4$$

where $\dot{\gamma}$ represents a shear rate of the molding material, $Wi(\dot{\gamma})$ represents an viscoelastic property of the molding material, $\tau$ represents a stress distribution, $\tau^{\nabla *}$ represents a rate of change of the stress distribution, $\eta_W(\dot{\gamma})$ represents the weighted viscosity distribution of the molding material, D represents a rate of deformation of the molding material, $\tau_A$ represents the molecular orientation effect on the stress distribution, and $A_4$ represents a molecular orientation distribution of the molding material.

In some embodiments, the molecular orientation effect on the stress distribution is represented by an expression:

$$\tau_A = 2\eta_W N_p D : A_4$$

where $N_p$ represents a dimensionless parameter, D represents a rate-of-deformation distribution, and $A_4$ represents a molecular orientation distribution of the molding material.

In some embodiments, the rate of change of the stress distribution is represented by an expression:

$$\tau^{\nabla *} = \frac{D\tau}{Dt} - \nabla L \cdot \tau - \tau \cdot L^T$$

$$L = \nabla u - \xi D$$

where $\nabla u$ represents the standard velocity gradient distribution, L represents an effective velocity gradient distribution and $\xi$ represents the effective factor.

In some embodiments, the effective factor is related to the shear rate of the molding material, and the effective factor is represented by an expression:

$$\xi(\dot{\gamma}) = \frac{\xi_0}{\left[1+\left(\frac{\dot{\gamma}}{\dot{\gamma}_{XC}}\right)^2\right]^{N_X}}$$

where $\xi_0$, $\dot{\gamma}_{XC}$, and $N_X$ represent parameters determined by using an experimental data.

In some embodiments, the viscoelastic property of the molding material is related to the shear rate of the molding material, and the viscoelastic property of the molding material is represented by an expression:

$$Wi(\dot{\gamma}) = \frac{Wi_0}{\left[1+\left(\frac{\dot{\gamma}}{\dot{\gamma}_{WC}}\right)^{-2}\right]^{N_W}}$$

where $Wi_0$, $\dot{\gamma}_{WC}$, and $N_W$ represent parameters determined by using an experimental data.

In some embodiments, the weighted viscosity distribution of the molding material is represented by an expression:

$$\eta_W = (1-W)\eta_S + W\eta_E$$

$$W = \frac{\dot{\gamma}_E^2}{\dot{\gamma}_T^2}$$

$$\dot{\gamma}_T^2 = \dot{\gamma}_S^2 + \dot{\gamma}_E^2$$

where W represents a weighting function, $\eta_S$ represents the shear viscosity of the molding material, $\eta_E$ represents the extension viscosity of the molding material, $\dot{\gamma}_T$ represents a total strain rate of the molding material, $\dot{\gamma}_S$ represents a characteristic shear rate of the molding material, and $\dot{\gamma}_E$ represents a characteristic extension rate of the molding material.

In some embodiments, the viscoelastic property of the molding material is determined by using an experimental data of a first normal stress difference represented by an expression:

$$N_1 = 2Wi\tau_{12}$$

where $\tau_{12}$ represents the shear viscosity of the molding material.

In some embodiments, the effective factor is determined by using an experimental data of a first normal stress difference and a second normal stress difference represented by an expression:

$$N_1 = 2Wi\tau_{12}$$

$$N_2 = -\frac{\xi}{2}N_1$$

where $\tau_{12}$ represents the shear viscosity of the molding material, $$\tau_{12} = \frac{\eta_S \dot{\gamma}}{1+W_i^2(1-C_N^2)}$$

and the parameter $C_N(\dot{\gamma})$ is given $$C_N(\dot{\gamma}) = 1 - \xi(\dot{\gamma})$$

In some embodiments, the first normal stress difference is related to the shear viscosity of the molding material.

In some embodiments, the second normal stress difference has a non-zero value.

In some embodiments, the molding material comprises polystyrene resin.

In some embodiments, the molding material comprises a plurality of polymer chains, and the molecular orientation effect of the molding material represents an orientation distribution of the polymer chains.

In some embodiments, the molding material comprises a plurality of fibers, and the molecular orientation effect of the molding material represents an orientation distribution of the fibers.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

The present disclosure is directed to a molding system for preparing a molded article using a computer-aided engineering (CAE) simulation. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Injection molding is a technology commonly used for high-volume manufacturing of parts made of synthetic resin, most commonly made of thermoplastic polymers. During a repetitive injection-molding process, a plastic resin, most often in the form of small beads or pellets, is introduced into an injection-molding machine that melts the resin beads under heat, pressure, and shear. The now-molten resin is forcefully injected into a mold cavity having a particular cavity shape. The injected plastic is held under pressure in the mold cavity, cooled, and then removed as a solidified part having a shape that essentially duplicates the cavity shape of the mold.

Polymers/Plastics applications can be found in almost all areas of everyday living due to their versatility with an economically attractive choice in the manufacturing industry. Polymer materials can be processed by fast, highly-automated methods, such as injection molding. Thickness-variation or contraction channels are one of familiar geometries for injection-molding products. An obvious vortex is significantly found in the corner of the thicker upstream channel. The vortex size is related to molecular structures of polymer melts.

Figure 1:
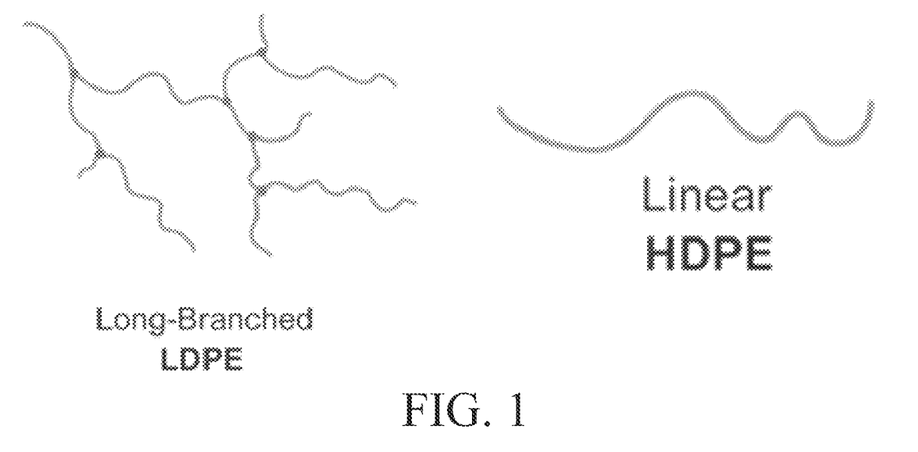
FIG. 1 schematically shows molecular structures of high-density polyethylene (HDPE) and low-density polyethylene (LDPE), respectively.

FIG. 1 schematically shows molecular structures of high-density polyethylene (HDPE) and low-density polyethylene (LDPE), respectively. Obviously, the HDPE and LDPE have different molecular structures: the HDPE is consisted of linear chains with "molecular orientation"; in contrast, the LDPE chain is branched in absence of molecular orientation.

Figure 2:
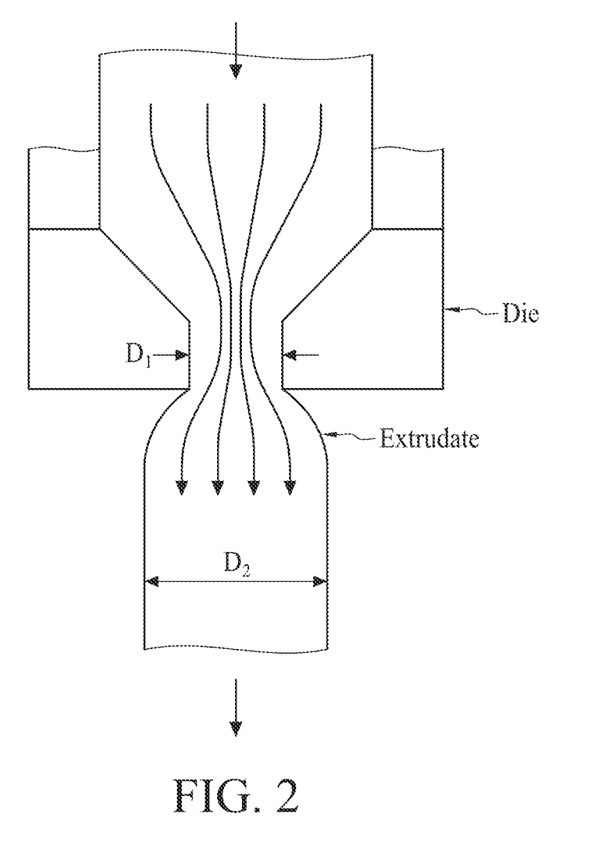
FIG. 2 shows an experimental observation of the die swell with an extrudate cross-section which is greater than a die cross-section.

The die well effect or extrudate swell is a complex viscoelastic phenomenon. As shown in FIG. 2, die swell can be experimentally observed as an extrudate with a cross-section $D_2$ which is greater than a die cross-section $D_1$. The die swell ratio, defined as $D_2/D_1$, is increased with the average flow rate or the apparent shear rate (See, for example, Bird, R. B., R. C. Armstrong, and O. Hassager, *Dynamics of Polymeric Liquids: Fluid Mechanics* (Wiley-Interscience, New York, 1987); Morrison, F. A., *Understanding Rheology* (Oxford University, 2001); the entirety of the above-mentioned publication is hereby incorporated by reference herein and made a part of this specification, which is incorporated herein by reference in its entirety).

Figure 3:
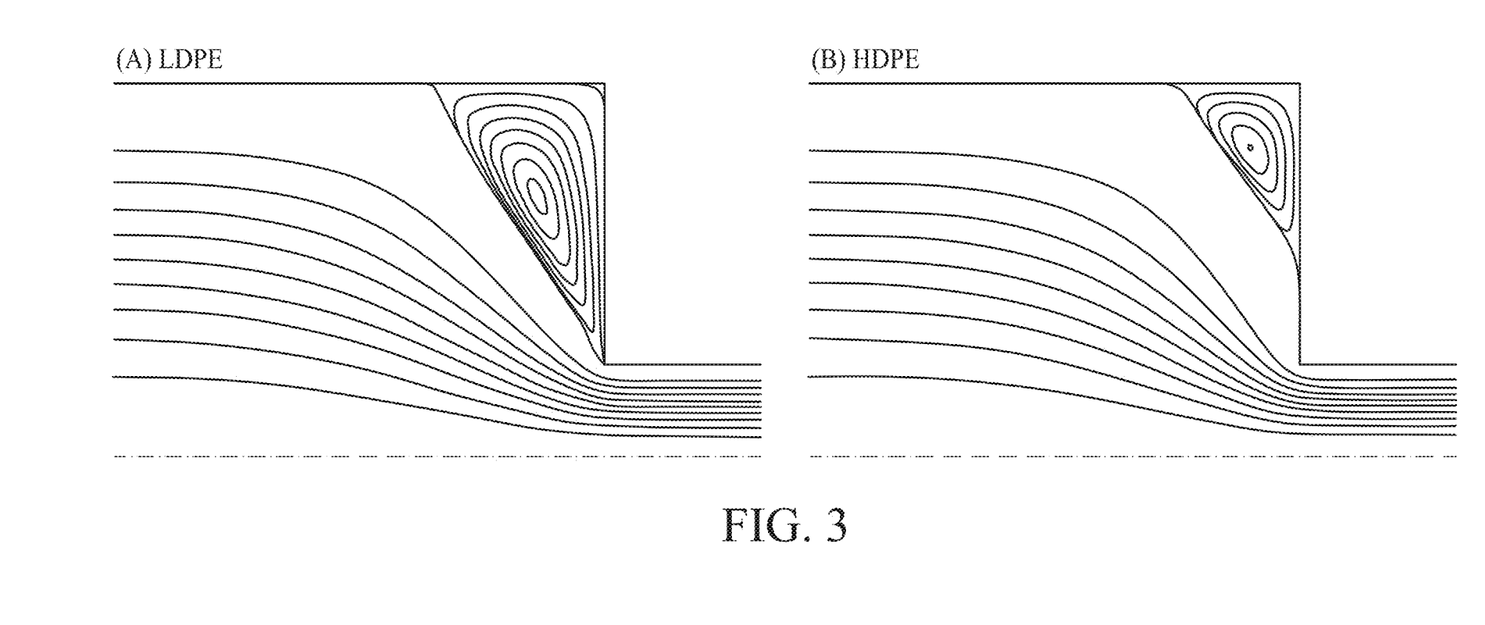
FIG. 3 shows an experimental observation of streamlines in 4:1 planar contraction flow patterns with corner vortex for LDPE and HDPE, respectively.

FIG. 3 shows an experimental observation of streamlines in 4:1 planar contraction flow patterns with corner vortex for LDPE and HDPE, respectively. As shown in FIG. 3, LDPE's vortex size is usually large than HDPE's.

In addition, understanding fibers filled in a polymer melt is an important challenge in fundamental rheology with viscoelastic properties strongly depending on the fiber orientation. During the startup shear flows with small shear rates, the change of fiber orientation induces a viscosity overshoot for fiber-filled fluids, whereas no such finding occurs in unfilled fluids (see, Eberle, A. P. R., G. M. Vélez-Garcia, D. G. Baird, and P. Wapperom, "Fiber Orientation Kinetics of a Concentrated Short Glass Fiber Suspension in Startup of Simple Shear Flow," J Non-Newtonian Fluid Mech 165 110-119 (2010), which is incorporated herein by reference in its entirety).

Figure 4:
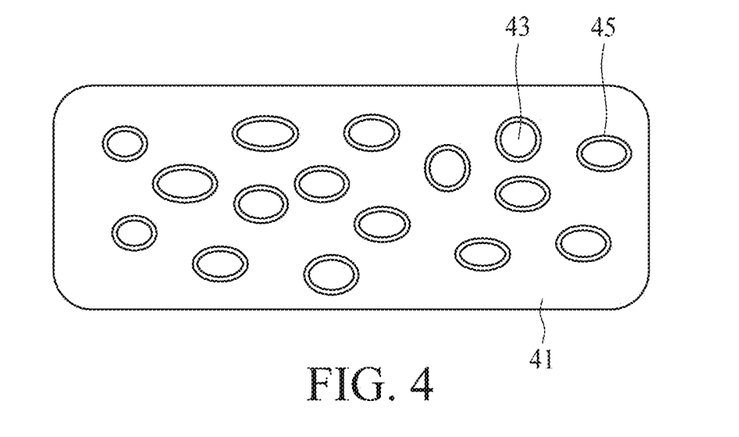
FIG. 4 shows a mixture of polymer matrix, fiber, and coupling agent at the macroscopic level according to the prior art.
Figure 5:
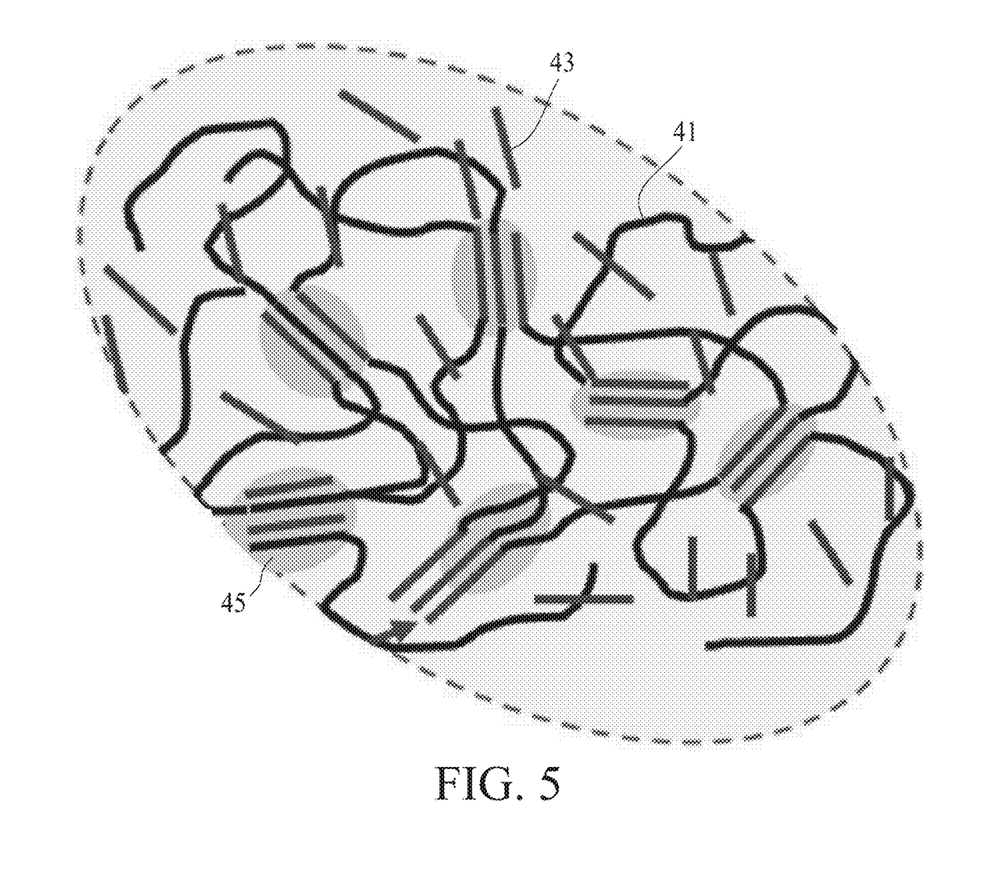
FIG. 5 shows a mixture of partial aligned polymer chains, fibers, and coupling agents at the microscopic level according to the prior art.

In a macroscopic view, a "fiber-reinforced composite" refers to as a material containing fibers embedded in a matrix with well-defined interfaces between two constitutive phases. At a macroscopic level, as shown in FIG. 4, the coupling agents 45 are small difunctional molecules acting as a bridge between the fibers 43 and the fluid (matrix) 41. If necessary, these additional coupling agents can be added to strengthen the cohesion between the inorganic fiber and organic polymer. At a microscopic level, FIG. 5 represents a mixture that exists in the practical suspension where the fibers 43 are immersed in a matrix of partial aligned polymer chains 41 by adding a small amount of the coupling agent 45. The coupling agent 45 is an interface medium between the fibers 43 and the polymer chains 41. The long polymer chains are an entanglement. Very probably, the fibers 43 are also entwined by the chains or adsorbed into the chains 41 through the coupling agent 45.

Figure 6:
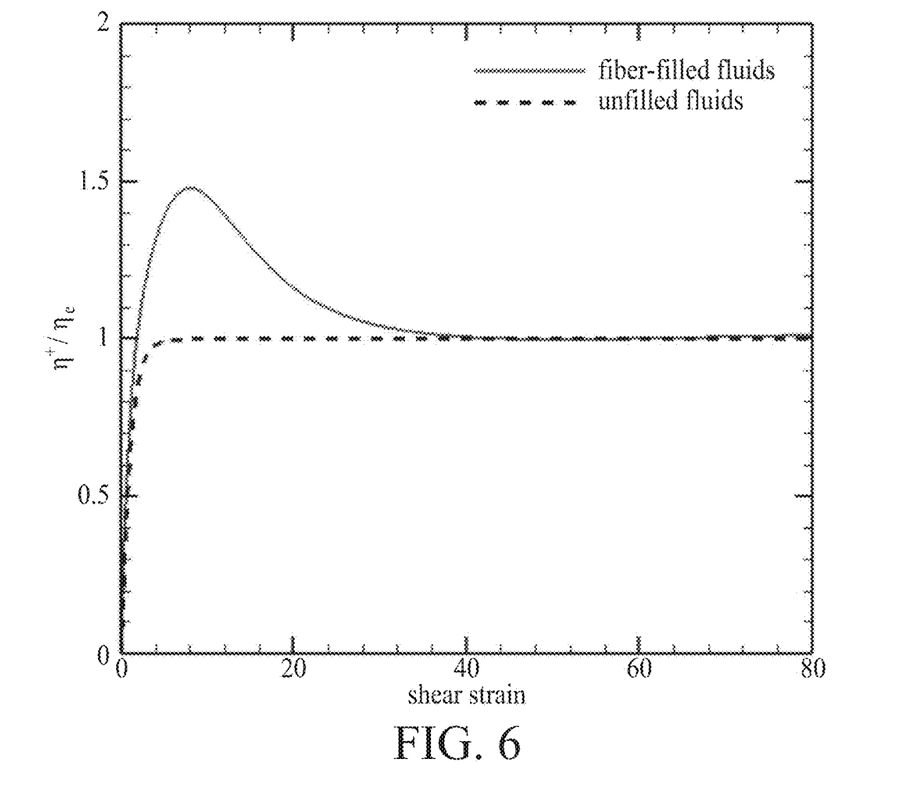
FIG. 6 shows normalized transient shear viscosity $\eta^+/\eta_e$ with respect to shear strains for the unfilled and fiber-filled fluids, respectively wherein $\eta^+$ and $\eta_e$ are transient-state and equilibrium-state values of shear viscosity, respectively.

FIG. 6 shows normalized transient shear viscosity $\eta^+/\eta_e$ with respect to shear strains for the unfilled and fiber-filled fluids, respectively wherein $\eta^+$ and $\eta_e$ are transient-state and equilibrium-state values of shear viscosity, respectively. The waveforms in FIG. 6 imply that the rheological nonlinearity of viscosity overshoot is relatively increased, when fibers are filled to a neat polymer.

Viscoelasticity (VE) is a primary property of polymer materials that exhibit both viscous and elastic characteristics. The corner vertex is a viscoelastic fluid behavior. Recently, Tseng et al. have proposed a modified White-Metzner (WM) viscoelastic fluid model (see, U.S. Pat. No. 11,027,470, which is incorporated herein by reference in its entirety). In the present innovation, such a viscoelastic model is further extended with the effect of molecular orientation on stress tensor for polymer melts, which is incorporated herein by reference in its entirety).

A typical injection-molding procedure comprises four basic operations: (1) heating the plastic resin in the injection-molding machine to allow it to flow under pressure; (2) injecting the melted plastic resin into a mold cavity or cavities defined between two mold halves that have been closed; (3) allowing the plastic resin to cool and harden in the cavity or cavities while under pressure; and (4) opening the mold halves to cause the cooled part to be ejected from the mold. In the conventional injection molding of synthetic resin by an injection-molding machine, the weight of the injected synthetic resin varies with the molten resin pressure, the molten resin specific volume, the molten resin temperature and other molten resin conditions. Therefore, it is difficult to form products of a consistent quality.

In general, the setting of molding conditions of the injection-molding machine requires a large number of trial molding operations and a lengthy setting time because the setting work largely depends on the know-how and experience of an operator of the injection-molding machine, and various physical values affect one another as well.

To control the quality of the molded products, a deep understanding of complicated flow fields is critical. Computer-aided engineering (CAE) software provides realistic simulation and predictive analysis for complex flows of complex fluids. In the academic research of fluid mechanics and rheology, nonlinear viscous models of the generalized Newtonian fluids (GNF) have been available in polymer processing flows. However, with these techniques it is difficult to simulate the viscoelastic behaviors encountered in the die swell. Rheological researchers have developed viscoelastic constitutive equations of the stress tensor for polymer liquids. The first and second normal stress differences, $N_1$ and $N_2$, are important material functions of viscoelastic fluids under simple shear flow (See, for example, Bird, R. B., R. C. Armstrong, and O. Hassager, *Dynamics of Polymeric Liquids: Fluid Mechanics* (Wiley-Interscience, New York, 1987); Morrison, F. A., *Understanding Rheology* (Oxford University, 2001); the entirety of the above-mentioned publication is hereby incorporated by reference herein and made a part of this specification). The White-Metzner constitutive equation is a nonlinear viscoelastic model with the relaxation time function, which is related to the GNF shear viscosity and the modulus (See, for example, Morrison, F. A., *Understanding Rheology* (Oxford University, 2001); White, J. L. and A. B. Metzner, "Development of Constitutive Equations for Polymeric Melts and Solutions," J Appl Polym Sci 7 867-1889 (1963); the entirety of the above-mentioned publication is hereby incorporated by reference herein and made a part of this specification). In practice, however, this model has difficulties simulating the die swell. There is a numerical divergent issue due to the strain hardening of extension viscosity with at high extension rates. In addition, the modulus parameter is not experimentally determined since the relaxation time is not easy to be measured. The first normal stress difference can be given, but the second one is not described. Therefore, the present disclosure proposes modifications to the White-Metzner constitutive equation to simulate the die swell effect.

The actual flow of polymer melts is transient, non-Newtonian and non-isothermal, with frozen layers building up as the complex mixture flows through the mold cavity. The governing equations of the fluid mechanics include the equation of continuity, the equation of motion, and the equation of energy to describe the transient and non-isothermal flow motion as follows:

$$\frac{\partial \rho}{\partial t} + \nabla \cdot \rho u = 0 \tag{1}$$

$$\frac{\partial}{\partial t}(\rho u) + \nabla \cdot (\rho u u) = -\nabla P + \nabla \cdot \tau + \rho g \tag{2}$$

$$\rho C_P \left( \frac{\partial T}{\partial t} + u \cdot \nabla T \right) = \nabla \cdot (k \nabla T) + \tau : D \tag{3}$$

where $\rho$ represents the density; u represents the velocity vector; t represents the time; $\tau$ represents the extra stress tensor (stress distribution); $\nabla u$ represents the velocity gradient tensor (velocity gradient distribution); D represents the rate-of-deformation tensor (i.e., symmetric tensor of $\nabla u$); g represents the acceleration vector of gravity; p represents the pressure; $C_p$ represents the specific heat; T represents the temperature; and k represents the thermal conductivity.

For polymer melts, the extra stress tensor T is defined by the generalized Newtonian fluid (GNF) viscous model as follows:

$$\tau = 2\eta_S(T,P,\dot\gamma)D \tag{4}$$

In general, the Cross-William-Landel-Ferry (Cross-WLF) flow curve model has been used in the present disclosure to describe the shear viscosity $\eta_S$ as a function of the temperature T, pressure P, and strain rate $\dot\gamma$ (see, Cross, M. M., "Relation between Viscoelasticity and Shear-Thinning Behaviour in Liquids," Rheol Acta 18 609-614 (1979), which is incorporated herein by reference in its entirety).

Furthermore, the flow curves of shear viscosity dominate the flow behaviors of a variety of materials. Commonly, the well-known Cross-WLF model used in polymer rheology and processing simulations can describe complex viscosity behaviors, including viscosity varying with shear rate for the Cross model and the zero-shear-rate viscosity, depending on temperature and pressure for the WLF model as follows:

$$\eta_S(\dot\gamma, T, P) = \frac{\eta_0(T, P)}{1 + \left(\frac{\eta_0 \dot\gamma}{\tau^*}\right)^{1-n}} \tag{5}$$

$$\eta_0(T, P) = D_1 \exp\left(\frac{-A_1(T - T_c)}{A_2 + (T - T_c)}\right) \tag{6}$$

$$T_c = D_2 + D_3 P \tag{7}$$

$$A_2 = \tilde{A}_2 + D_3 P \tag{8}$$

where seven parameters are fit by related experimental data, including n, $\tau^*$, $A_1$, $\tilde{A}_2$, $D_1$, $D_2$ and $D_3$.

The extensional viscosity is always non-dimensionalized with the shear viscosity. This ratio Tr is called the Trouton ratio:

$$Tr = \frac{\eta_E}{\eta_S} \quad (9)$$

For isotropic Newtonian viscosity, the Trouton ratio ideally equals 3, 4, and 6 in the uniaxial, planar, and biaxial extension flows, respectively. In practice, it is difficult to directly model the extensional viscosity via a mathematical relationship (see, Sarkar, D. and M. Gupta, "Further Investigation of the Effect of Elongational Viscosity on Entrance Flow," J Reinf Plast Compos 20 1473-1484 (2001), which is incorporated herein by reference in its entirety). Therefore, Sarkar and Gupta provided a strain-rate dependence of the Trouton ratio function to determine the extensional viscosity as follows:

$$Tr(\dot{\gamma}) = 3 + \delta\left[1 - \frac{1}{\sqrt{1 + (\lambda\dot{\gamma})^2}}\right] \quad (10)$$

$$\eta_E(\dot{\gamma}) = \eta_S(\dot{\gamma})Tr(\dot{\gamma}) \quad (11)$$

where the parameters $\delta$ and $\lambda$ are fitted by experimental extension viscosity data. This model can complete the extension viscosity curve with low-strain-rate extension thickening.

Based on the previous work of Sarkar and Gupta, Tseng (see, Tseng, H.-C., "A Revisitation of Generalized Newtonian Fluids," J Rheol 64 493-504 (2020), which is incorporated herein by reference in its entirety) recently proposed a new Trouton ratio expression:

$$Tr(\dot{\gamma}) = 3 + \frac{T_0}{[1 + (\lambda_T\dot{\gamma})^{-2}]^{n_T}} \quad (12)$$

where three parameters of $T_0$, $\lambda_T$, and $n_T$ are fitted by experimental extension viscosity data to describe the significant extension thinning and extension thickening characteristics. Moreover, Tseng also derived the weighted shear/extensional viscosity $\eta_W(\dot{\gamma})$, called the eXtended GNF (GNF-X) viscous model, as below:

$$\eta_W = (1 - W)\eta_S + W\eta_E \quad (13)$$

$$1 - W = \frac{\dot{\gamma}_S^2}{\dot{\gamma}_T^2} \quad (14)$$

$$W = \frac{\dot{\gamma}_E^2}{\dot{\gamma}_T^2} \quad (15)$$

$$\dot{\gamma}_T^2 = \dot{\gamma}_S^2 + \dot{\gamma}_E^2 \quad (16)$$

where W is the weighting function, and also called the extension fraction; $\eta_S$ and $\eta_E$ are the GNF shear viscosity and extensional viscosity with respect to strain rates, respectively. $\dot{\gamma}_S$ and $\dot{\gamma}_E$ are the principal shear rate and principal extensional rate, respectively; and $\dot{\gamma}_T$ is the total strain rate. Note that 1−W and W represent the shear-rate and extension-rate percentages, respectively. When W=0, the GNF-X weighted viscosity returns to the GNF shear viscosity. The details of the GNF-X weighted viscosity are available elsewhere (see, Tseng, H.-C., "A Revisitation of Generalized Newtonian Fluids," J Rheol 64 493-504 (2020), which is incorporated herein by reference in its entirety). Note that the generalized extensional viscosity $\eta_E$ is respectively given as $$\eta_E = \frac{\eta_{UE}}{3}, \eta_E = \frac{\eta_{PE}}{4},$$

and $$\eta_E = \frac{\eta_{BE}}{6}$$

for uniaxial, planar, and biaxial extensional flows, wherein $\eta_{UE}$ is the uniaxial extensional (UE) viscosity; the planar extensional (PE) viscosity $\eta_{PE}$; the biaxial extensional (BE) viscosity $\eta_{BE}$.

Based on the GNF-X weighted viscosity, Tseng et al. (see, U.S. Pat. No. 11,027,470, which is incorporated herein by reference in its entirety) have the invention to effectively modify the White-Metzner viscoelastic model below, which can successfully simulate the die swell phenomenon of polymer melts.

$$\frac{W_i(\dot{\gamma})}{\dot{\gamma}}\overset{\nabla}{\tau}^* + \tau = 2\eta_W(\dot{\gamma})D \quad (17)$$

$$Wi(\dot{\gamma}) = \frac{Wi_0}{\left[1 + \left(\frac{\dot{\gamma}}{\dot{\gamma}_{WC}}\right)^{-2}\right]^{N_W}} \quad (18)$$

$$\overset{\nabla}{\tau}^* = \frac{D\tau}{Dt} - \nabla L \cdot \tau - \tau \cdot L^T \quad (19)$$

$$\frac{D\tau}{Dt} = \frac{\partial \tau}{\partial t} + u \cdot \nabla \tau \quad (20)$$

$$L = \nabla u - \xi D \quad (21)$$

$$\xi(\dot{\gamma}) = \frac{\xi_0}{\left[1 + \left(\frac{\dot{\gamma}}{\dot{\gamma}_{XC}}\right)^2\right]^{N_X}} \quad (22)$$

where $Wi(\dot{\gamma})$ and $\xi$ are the Weissenberg number and slip factor and depend on the strain rate $\dot{\gamma}$; All of model parameters $\xi_0$, $\dot{\gamma}_{XC}$, $N_X$, $Wi_0$, $\dot{\gamma}_{WC}$, and $N_W$ are fitted by experimental data.

Early, the pioneers of Lipscomb et al. (see, Lipscomb II, G. G., M. M. Denn, D. U. Hur, and D. V. Boger, "The Flow of Fiber Suspensions in Complex Geometries," J Non-Newtonian Fluid Mech 26 297-325 (1988) and Wang, J., J. F. O'Gara, and C. L. Tucker III, "An Objective Model for Slow Orientation Kinetics in Concentrated Fiber Suspensions: Theory and Rheological Evidence," J Rheol 52 1179-1200 (2008), which is incorporated herein by reference in its entirety) developed a constitutive equation of dilute fiber suspensions in which the effect of fiber orientation on flow stress can be modeled:

$$\tau = 2\eta_m D + 2\eta_m \phi N_p D : A_4 \quad (23)$$

where τ is the extra stress tensor; D is the rate-of-deformation tensor; $\eta_m$ is the matrix viscosity; φ is the fiber volume fraction; $N_p$ is a dimensionless parameter. The fourth-order orientation tensor of fibers A4 is determined by using a higher order polynomial closure approximation in terms of the second-order orientation tensor A.

From the above equation, the first term is the viscous contribution of a polymer matrix, and the second term is the effect of fiber orientation on the stress tensor (stress distribution) of the fluid. Therefore, the present disclosure can assume the effect of molecular orientation on stress tensor for neat polymer matrix as follows:

$$\tau_A = 2\eta_W N_p D : A_4 \qquad (24)$$

Furthermore, the modified WM viscoelastic model with molecular orientation can be extended as follows:

$$\frac{Wi(\dot{\gamma})}{\dot{\gamma}} \overset{\nabla}{\tau^*} + \tau = 2\eta_w(\dot{\gamma})D + \tau_A = \eta_W(\dot{\gamma})D + 2\eta_W N_p D : A_4 \qquad (25)$$

This can be known as the extended WM viscoelastic model. Finally, the extended WM viscoelastic model is integrated into the Moldex3D, as shown in FIG. 8.

In the present disclosure, a planar contraction flow simulation was performed via the Moldex3D, incorporating the extended WM model with the molecular orientation effect. Two materials of interest are the branched LDPE and the linear HDPE. The contraction flow is given at the isothermal temperature 150° C. and the constant flow rate of 150 mm³/s (or the apparent shear rate=122 s⁻¹). As a result, it is obvious that LDPE's vortex size is large than HDPE's. This is in good agreement with the experimental observation. Therefore, the present invention is verified to be an effective method for the effect of molecular orientation on viscoelastic fluid behaviors.

Figure 7:
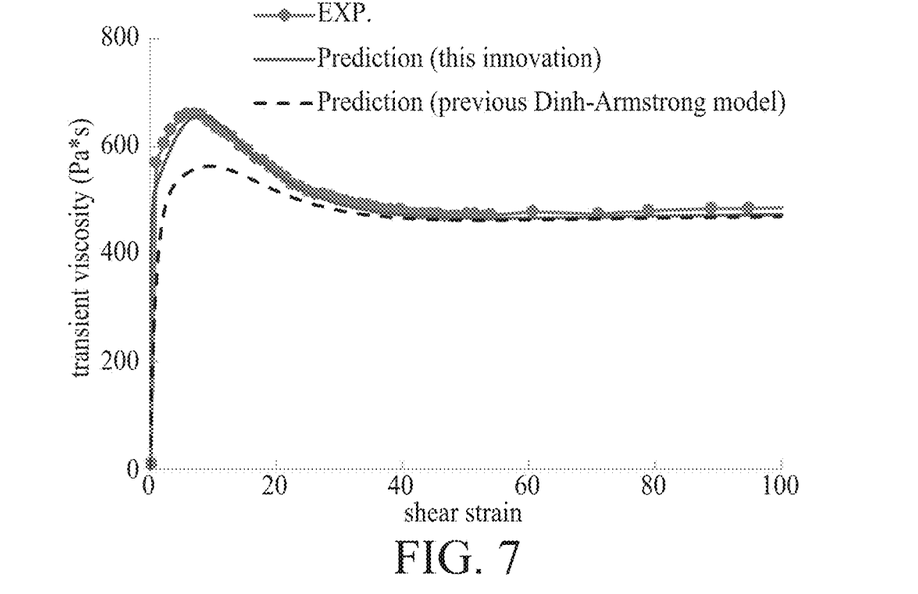
FIG. 7 shows the transient shear viscosity for 30 wt % SGF/PBT (polybutylene terephthalate resin containing 30% by weight of short glass fibers) composite at shear rate $\dot{\gamma}=1.0$ $s^{-1}$ and 260° C.

In addition, FIG. 7 shows the transient shear viscosity for 30 wt % SGF/PBT (polybutylene terephthalate resin containing 30% by weight of short glass fibers) composite at shear rate $\dot{\gamma}$=1.0 s⁻¹ and 260° C. The suspended WMT-X model predictions are in good agreement with experimental data, especially for the viscosity overshoot (see, Eberle, A. P. R., G. M. Vélez-Garcia, D. G. Baird, and P. Wapperom, "Fiber Orientation Kinetics of a Concentrated Short Glass Fiber Suspension in Startup of Simple Shear Flow," J Non-Newtonian Fluid Mech 165 110-119 (2010), which is incorporated herein by reference in its entirety).

Figure 8:
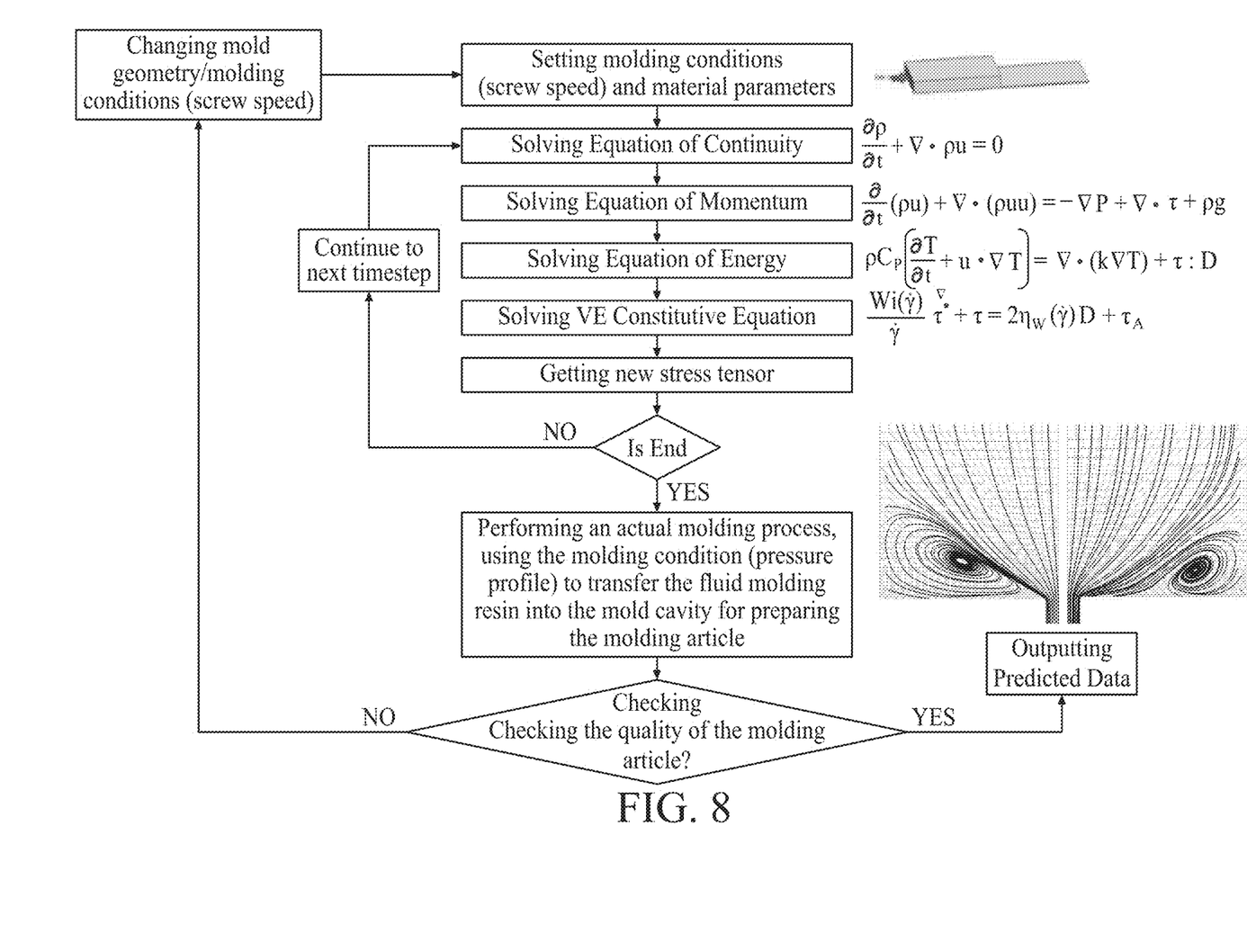
FIG. 8 is a flowchart showing an injection-molding simulation operation in accordance with some embodiments of the present disclosure.

FIG. 8 is a flowchart showing an injection-molding simulation operation in accordance with some embodiments of the present disclosure. As shown in FIG. 8, the CAE simulation software can calculate the stress tensor τ by applying the modified White-Metzner constitutive equation for the subsequent die swell effect analysis. In addition, after calculating the stress tensor τ, if the numerical calculation results are not convergent, the fiber parameters or the molding conditions may be adjusted, and another simulation can be performed to obtain updated calculation results. By applying the modified White-Metzner constitutive equation, the die swell effect of the molding resin can be effectively simulated.

In some embodiments, the simulation operation may be repeated with different boundary conditions to obtain a feasible molding condition (e.g., a screw speed with a flow rate for transferring desired amount of molding material into the mold cavity during the very short injection phase); then, in the actual molding step, the controller operates the molding machine (controlling the driving motor 230 to move the screw 220 at a predetermined speed) with the feasible molding condition for transferring the fluid molding material into the mold cavity to perform an actual molding process for preparing the molding article. If the quality of the prepared molding article is different from the designed, the simulation operation may be further repeated with different boundary conditions to obtain another feasible molding condition (e.g., an updated screw speed with an updated flow rate for transferring desired amount of molding material into the mold cavity) in the subsequent actual molding step.

With continuing reference to FIG. 8, in injection-molding simulation operations, the governing equations of fluid mechanics that describe the transient flow behaviors are as follows:

$$\frac{\partial \rho}{\partial t} + \nabla \cdot \rho u = 0 \qquad (28)$$

$$\frac{\partial}{\partial t}(\rho u) + \nabla \cdot (\rho u u) = -\nabla P + \nabla \cdot \tau + \rho g \qquad (29)$$

$$\rho C_p \left( \frac{\partial T}{\partial t} + u \cdot \nabla T \right) = \nabla \cdot (k \nabla T) + \tau : D \qquad (30)$$

$$\frac{Wi(\dot{\gamma})}{\dot{\gamma}} \overset{\nabla}{\tau^*} + \tau = 2\eta_w(\dot{\gamma})D + \tau_A = \eta_W(\dot{\gamma})D + 2\eta_W N_p D : A_4 \qquad (31)$$

where ρ represents the density; u represents the velocity vector; t represents the time; τ represents the extra stress tensor; ∇u represents the velocity gradient tensor (velocity gradient distribution); g represents the acceleration vector of gravity; p represents the pressure; $C_p$ represents the specific heat; T represents the temperature; k represents the thermal conductivity; $\tau^{\nabla *}$ represents the effective upper convected time derivative of the extra stress tensor; $Wi(\dot{\gamma})$ represents the Weissenberg number; $\eta_W(\dot{\gamma})$ represents the weighted viscosity of the molding resin; D represents a rate of deformation of the molding resin; and $\dot{\gamma}$ represents the shear rate of the molding resin; $\tau_A$ represents the molecular orientation effect on the stress distribution, $N_p$ represents a dimensionless parameter, and $A_4$ represents a molecular orientation distribution of the molding material.

Solving the governing equations (28)-(31) requires a transient state analysis, which can be performed numerically using a computer (See, for example, Rong-Yeu Chang and Wen-hsien Yang, "Numerical simulation of mold filling in injection molding using a three-dimensional finite volume approach," International Journal for Numerical Methods in Fluids Volume 37, Issue 2, pages 125-148, Sep. 30, 2001; the entirety of the above-mentioned publication is hereby incorporated by reference herein and made a part of this specification, which is incorporated herein by reference in its entirety). During the transient state analysis, the process variables that change with time are not zero; i.e., the partial derivatives ∂/∂t in the governing equations (28)-(31) are not considered zero.

The true 3D Finite Volume Method (FVM) is employed due to its robustness and efficiency to solve the transient flow fields in a complex 3D geometrical article. In some embodiments of the present disclosure, the simulation flow in FIG. 8 can be implemented using a commercial injection-molding simulation software, Moldex3D (CoreTech System Co. of Taiwan), to facilitate the orientation predictions of the fiberless molding resin.

In some embodiments, the simulating process may be repeated with different boundary conditions to obtain a feasible molding condition (e.g., a screw speed with a flow rate for transferring desired amount of molding material into the mold cavity); then, in the actual molding step, the controller operates the molding machine (control the driving motor 230 to move the screw 220 at a predetermined screw speed) with the feasible molding condition for transferring the fluid molding material into the mold cavity to perform an actual molding process for preparing the molding article. If the size of the prepared molding article is different from the simulating result, the simulating process may be further repeated with different boundary conditions to obtain another feasible molding condition (e.g., an updated screw speed with an updated flow rate for transferring desired amount of molding material into the mold cavity) in the subsequent actual molding step.

Figure 9:
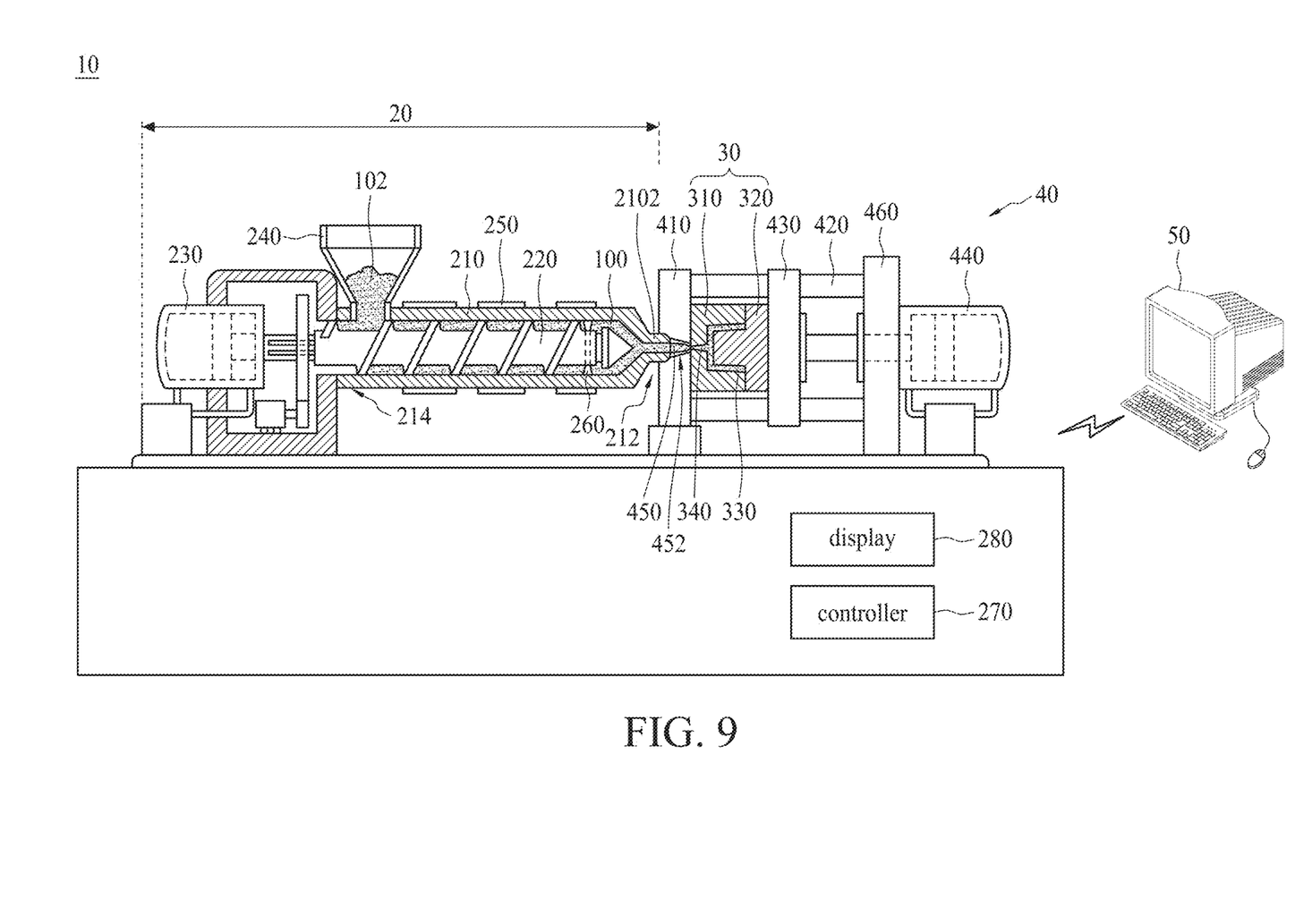
FIG. 9 is a schematic view of an injection-molding apparatus in accordance with some embodiments of the present disclosure.

FIG. 9 is a schematic view of an injection-molding apparatus 10 in accordance with some embodiments of the present disclosure. Referring to FIG. 9, the injection-molding apparatus 10 that can be used to carry out molding includes a molding machine 20, a mold 30, a clamping assembly 40 and a computer 50. The molding machine 20 includes a barrel 210 having a downstream end 212 connected to the mold 30. The mold 30 includes mold halves 310 and 320 to define a mold cavity 330 and a runner 340 in communication with the mold cavity 330.

The clamping assembly 40 is in operative connection with the mold 30 for clamping the mold halves 310 and 320. In some embodiments, the clamping assembly 40 includes a fixed plate 410, a plurality of tie bars 420 mounted on the fixed plate 410, and a moving plate 430 slidably engaged with the tie bars 420 and guided by a is driving cylinder 440. The mold half 310 proximal to the barrel 210 is secured on the fixed plate 410, and the mold half 320 distal to the barrel 210 is secured on the moving plate 430 in any suitable manner, wherein the driving cylinder 440 drives the moving plate 430 to open or close the mold 30. In some embodiments, the barrel 210 includes a nozzle 2102 adapted to engage a sprue 450 in the fixed plate 410. In some embodiments, the sprue 450 is in communication with the runner 340 as the mold half 310 is assembled with the fixed plate 410. In some embodiments, the fixed plate 410 may be equipped with a sprue bush 452 including the sprue 450 and receiving the nozzle 2102 during an injection time. A molding material 100 under pressure is delivered to the sprue bush 452 from the nozzle 2102 pressed tightly against the sprue bush 452 in order to deliver the molding material 100 to the sprue 450 during a filling stage of the injection time. In some embodiments, the molding material 100 may be a molding resin such as polystyrene resin, for example.

In some embodiments, the clamping assembly 40 further includes an ejector plate 460 mounted with at least one ejector pin (not shown), wherein the moving plate 430 is disposed between the fixed plate 410 and the ejector plate 460. In some embodiments, the ejector plate 460 is fixed on the tie bar 420. In some embodiments, the driving cylinder 440 penetrates the ejector plate 460 and directly connects to the moving plate 430 to open or close the mold 30. After the mold halves 310 and 320 are separated (i.e., the mold 30 is opened), a distance between the moving plate 430 and the ejector plate 460 is reduced, so the ejector pin can penetrate through the ejector plate 460 to push a molded product out of the mold 30.

A screw 220 is mounted for moving within the barrel and is operably connected, at an upstream end 214 opposite to the downstream end 212 of the barrel 210, to a driving motor 230. The molding machine 20 processes material, such as plastic granules 102, by feeding the material through a hopper 240 to the barrel 210 in order to make the material soft and force the molding material 100 into the mold 30 by the use of the screw 220, wherein the plastic granules 102 change phase from solid to liquid by at least one heater band 250 surrounding the barrel 210. In some embodiments, the molding machine 20 further includes a check valve 260 mounted on the screw 220, wherein the check valve 260 is in tight contact with the barrel 210 during the filling stage, and the check valve 260 is open for allowing the liquid material to flow to the downstream end 212 of the barrel 210 during a packing stage. In some embodiments, if the mold cavity 330 is almost filled with the molding material 100, a packing process proceeds. In some embodiments, the screw 220 rotates and moves toward the upstream end 214 of the barrel 210 during the packing stage.

The molding machine 20 further includes a controller 270 for controlling and monitoring the real-time functions of the molding machine 20, and a display 280 for displaying data related to the performance and operation of the molding machine 20 to on-site technicians. In some embodiments, the display 280 is further configured to accept input data from the on-site technicians. In other words, the display 280 is provided with a communications link directly with the controller 270 to provide real-time control of the molding to machine 20 by the on-site technicians particularly where the on-site technicians' intervention is required.

In some embodiments, the molding machine 20 can further include operation interface communication links among the controller 270, the display 280 and peripheral devices, and a program sequence of operation which allows the operation interface to monitor diagnostic functions of the controller 270 and the molding machine 20, trigger sound and/or light alarms regarding conditions of the molding machine 20, receive performance data from the molding machine 20, and receive input data from the display 280.

The computer 50 is associated with the molding machine 20 and is configured to execute CAE simulation software and transmit at least one simulation result to the controller 270 through a connection such as a hard wire connection or a wireless coupling. In some embodiments, the computer 50 includes a standardized operating system capable of running general-purpose application software for assisting with the analysis and process of the performance data and for communicating with the controller 270 and the display 280 via communication ports of each.

Figure 10:
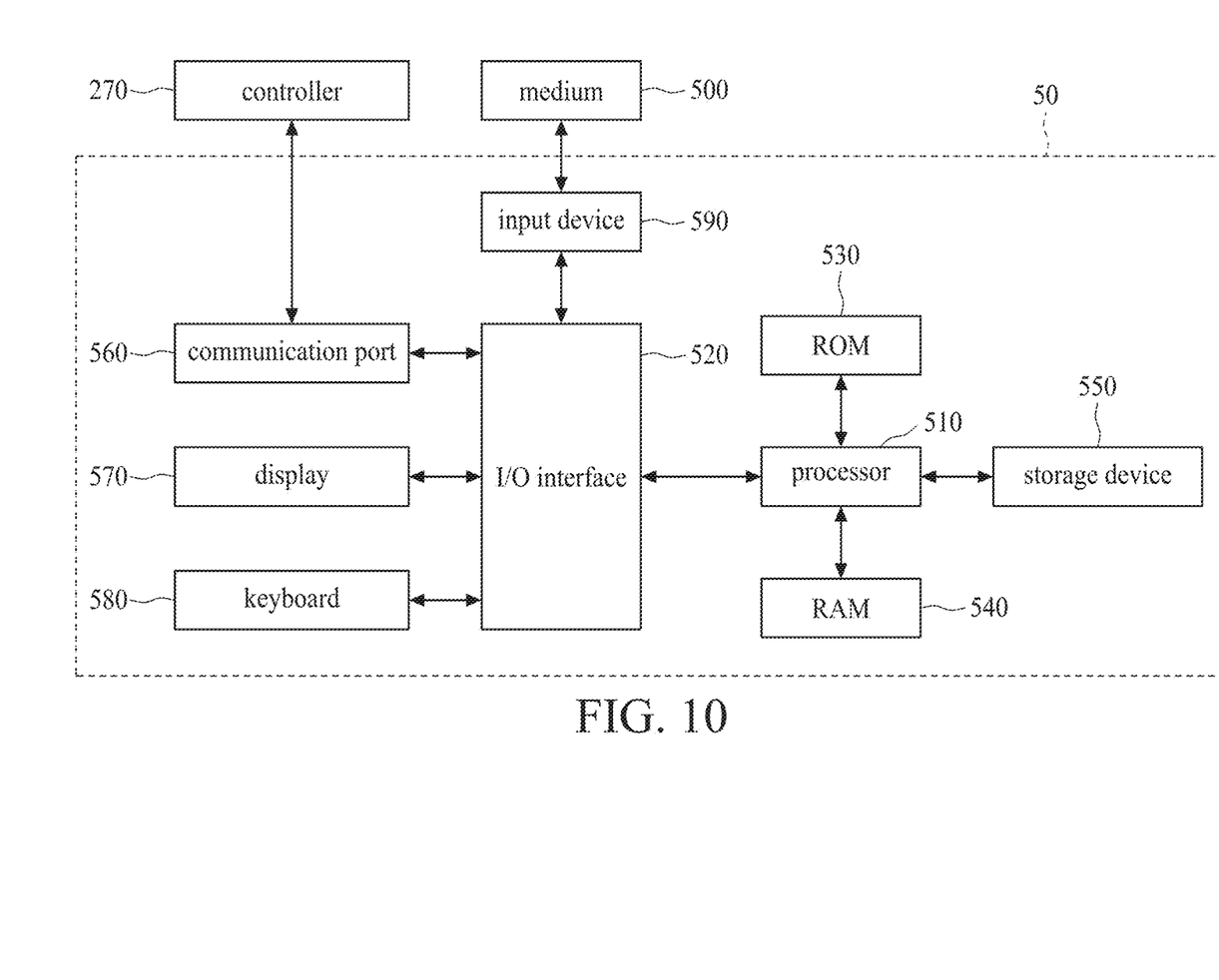
FIG. 10 is a functional block diagram of the computer in FIG. 9 in accordance with some embodiments of the present disclosure.

FIG. 10 is a functional block diagram of the computer 50 in FIG. 9. Referring to FIG. 10, the computer 50 includes a processing module 510 such as a processor adapted to perform a computer-implemented simulation method for use in injection molding, an input/output (I/O) interface 520 electrically coupled to the processing module 510, and memories, which may include a read-only memory (ROM) 530, a random access memory (RAM) 540 and a storage device 550. The ROM 530, the RAM 540 and the storage device 550 are to operably communicate with the processing module 510.

The computer 50 further includes a communication port 560 associated with the controller 270 of the molding machine 20. The computer 50 may further include one or more accompanying input/output devices including a display 570, a keyboard 580 and one or more other input devices 590. The input devices 590 may include a card reader, an optical disk drive or any other device that allows the computer 50 to receive input from the on-site technicians. In some embodiments, the input devices 590 are configured to input computer instructions (software algorithms) stored in a non-transitory computer-readable medium 500, and the processing module 510 is configured to execute operations for performing a computer-implemented injection-molding simulation method according to the computer instructions. In some embodiments, the processing module 510 reads software algorithms from the other input device 590 or the storage device 550, executes the calculation steps, and stores the calculated result in the RAM 540.

The present disclosure provides a molding system for preparing a molded article, comprising a molding machine, including a barrel, a screw mounted for moving within the barrel, a driving motor driving the screw to move a molding resin; a mold disposed on the molding machine and connected to the barrel of the molding machine to receive the molding resin, and having a mold cavity with a die swell structure for being filled with the molding resin; a processing module simulating a filling process of the molding resin from the barrel into the molding cavity based on a molding condition including a predetermined screw speed for the molding machine, wherein simulating the filling process of the molding resin is performed taking into consideration of a die swell effect of the molding resin; and a controller operably communicating with the processing module to receive the molding conditions and with the molding machine to control the driving motor of the molding machine based on the molding conditions to move the screw at the predetermined screw speed to transfer the molding resin at a corresponding flow rate to perform an actual molding process for preparing the molded article.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, and steps.

What is claimed is:

1. A molding system for preparing a molded article, comprising:
   a molding machine, including a barrel, a screw mounted for moving within the barrel, a driving motor driving the screw to move a molding material;
   a mold disposed on the molding machine and connected to the barrel of the molding machine to receive the molding material, and having a mold cavity with a die swell structure for being filled with the molding material;
   a processing module simulating a filling process of the molding material from the barrel into the molding cavity based on a molding condition including a predetermined screw speed for the molding machine, wherein simulating the filling process of the molding material comprises simulating a die swell effect of the molding material in the die swell structure by taking into consideration of an effective factor, a shear viscosity, an extension viscosity, a shear rate, and a molecular orientation effect of the molding material; and
   a controller operably communicating with the processing module to receive the molding conditions and with the molding machine to control the driving motor of the molding machine based on the molding conditions to move the screw at the predetermined screw speed to transfer the molding material at a corresponding flow rate to perform an actual molding process for preparing the molded article;
   wherein the processing module performs a model to simulate the die swell effect of the molding material, and the model is represented by an expression:

$$\frac{Wi(\dot{\gamma})}{\dot{\gamma}} \overset{\nabla}{\tau}{}^* + \tau = 2\eta_w(\dot{\gamma})D + \tau_A = \eta_W(\dot{\gamma})D + 2\eta_W N_p D : A_4$$

where $\dot{\gamma}$ represents a shear rate of the molding material, $Wi(\dot{\gamma})$ represents an viscoelastic property of the molding material, $\tau$ represents a stress distribution, $\tau^{\nabla*}$ represents a rate of change of the stress distribution, $\eta_W(\dot{\gamma})$ represents the weighted viscosity distribution of the molding material, D represents a rate of deformation of the molding material, and $\tau_A$ represents the molecular orientation effect on the stress distribution.

2. The molding system of claim 1, wherein the molecular orientation effect on the stress distribution is represented by an expression:

$$\tau_A = 2\eta_W N_p D : A_4$$

where $N_p$ represents a dimensionless parameter, D represents a rate-of-deformation distribution, and $A_4$ represents a molecular orientation distribution of the molding material.

3. The molding system of claim 1, wherein the rate of change of the stress distribution is represented by an expression:

$$\overset{\nabla}{\tau}{}^* = \frac{D\tau}{Dt} - \nabla L \cdot \tau - \tau \cdot L^T$$

$$L = \nabla u - \xi D$$

where $\nabla u$ represents the standard velocity gradient distribution, L represents an effective velocity gradient distribution and $\xi$ represents the effective factor.

4. The molding system of claim 3, wherein the effective factor is related to the shear rate of the molding material, and the effective factor is represented by an expression:

$$\xi(\dot{\gamma}) = \frac{\xi_0}{\left[1 + \left(\frac{\dot{\gamma}}{\dot{\gamma}_{XC}}\right)^2\right]^{N_X}}$$

where $\xi_0$, $\dot{\gamma}_{XC}$, and $N_X$ represent parameters determined by using an experimental data.

5. The molding system of claim 1, wherein the viscoelastic property of the molding material is related to the shear rate of the molding material, and the viscoelastic property of the molding material is represented by an expression:

$$Wi(\dot{\gamma}) = \frac{Wi_0}{\left[1 + \left(\frac{\dot{\gamma}}{\dot{\gamma}_{WC}}\right)^{-2}\right]^{N_W}}$$

where $Wi_0$, $\dot{\gamma}_{WC}$, and $N_W$ represent parameters determined by using an experimental data.

6. The molding system of claim 1, wherein the weighted viscosity distribution of the molding material is represented by an expression:

$$\eta_W = (1-W)\eta_S + W\eta_E$$
$$W = \frac{\dot{\gamma}_E^2}{\dot{\gamma}_T^2}$$
$$\dot{\gamma}_T^2 = \dot{\gamma}_S^2 + \dot{\gamma}_E^2$$

where W represents a weighting function, $\eta_S$ represents the shear viscosity of the molding material, $\eta_E$ represents the extension viscosity of the molding material, $\dot{\gamma}_T$ represents a total strain rate of the molding material, $\dot{\gamma}_S$ represents a characteristic shear rate of the molding material, and $\dot{\gamma}_E$ represents a characteristic extension rate of the molding material.

7. The molding system of claim 1, wherein the viscoelastic property of the molding material is determined by using an experimental data of a first normal stress difference represented by an expression:

$$N_1 = 2Wi\tau_{12}$$

where $\tau_{12}$ represents the shear viscosity of the molding material.

8. The molding system of claim 2, wherein the effective factor is determined by using an experimental data of a first normal stress difference and a second normal stress difference represented by an expression:

$$N_1 = 2Wi\tau_{12}$$
$$N_2 = -\frac{\xi}{2}N_1$$

where $\tau_{12}$ represents the shear viscosity of the molding material, $$\tau_{12} = \frac{\eta_S \dot{\gamma}}{1 + W_i^2(1 - C_N^2)}$$

and the parameter $C_N(\dot{\gamma})$ is given $$C_N(\dot{\gamma}) = 1 - \xi(\dot{\gamma}).$$

9. The molding system of claim 7, wherein the first normal stress difference is related to the shear viscosity of the molding material.

10. The molding system of claim 7, wherein the second normal stress difference has a non-zero value.

11. The molding system of claim 1, wherein the molding material comprises polystyrene resin.

12. The molding system of claim 1, wherein the molding material comprises a plurality of polymer chains, and the molecular orientation effect of the molding material represents an orientation distribution of the polymer chains.

13. A molding system for preparing a molded article, comprising:
  a molding machine, including a barrel, a screw mounted for moving within the barrel, a driving motor driving the screw to move a molding material;
  a mold disposed on the molding machine and connected to the barrel of the molding machine to receive the molding material, and having a mold cavity with a die swell structure for being filled with the molding material;
  a processing module simulating a filling process of the molding material from the barrel into the molding cavity based on a molding condition including a predetermined screw speed for the molding machine, wherein simulating the filling process of the molding material comprises simulating a die swell effect of the molding material in the die swell structure by taking into consideration of an effective factor, a shear viscosity, an extension viscosity, a shear rate, and a molecular orientation effect of the molding material; and
  a controller operably communicating with the processing module to receive the molding conditions and with the molding machine to control the driving motor of the molding machine based on the molding conditions to move the screw at the predetermined screw speed to transfer the molding material at a corresponding flow rate to perform an actual molding process for preparing the molded article
  wherein the molding material comprises a plurality of fibers, and the molecular orientation effect of the molding material represents an orientation distribution of the fibers.

* * * * *